United States Patent
Horii et al.

(10) Patent No.: US 7,914,161 B2
(45) Date of Patent: Mar. 29, 2011

(54) OUTER MIRROR STRUCTURE FOR VEHICLE

(75) Inventors: Takyoshi Horii, Wako (JP); Mitsuhiro Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 12/266,998

(22) Filed: Nov. 7, 2008

(65) Prior Publication Data

US 2009/0122431 A1 May 14, 2009

(30) Foreign Application Priority Data

Nov. 9, 2007 (JP) ................... 2007-292088

(51) Int. Cl.
*G02B 7/182* (2006.01)
(52) U.S. Cl. ....................................................... 359/872
(58) Field of Classification Search .................. 359/871, 359/872, 879, 880
See application file for complete search history.

(56) References Cited

U.S. PATENT DOCUMENTS

| 6,981,789 B2 * | 1/2006 | Assinder et al. ............. 362/494 |
| 2001/0040744 A1 | 11/2001 | Sakamoto et al. |
| 2005/0174789 A1 | 8/2005 | Seguchi |

FOREIGN PATENT DOCUMENTS

| JP | 60-50045 | 4/1985 |
| JP | 08-156687 | 6/1996 |
| JP | 2001-322497 | 11/2001 |
| JP | 2001-332316 | 11/2001 |
| JP | 2003-104125 | 4/2003 |
| JP | 2005-212755 | 8/2005 |
| JP | 2005-263028 | 9/2005 |
| JP | 2005-263030 | 9/2005 |

\* cited by examiner

*Primary Examiner* — Euncha P Cherry
(74) *Attorney, Agent, or Firm* — Rankin, Hill & Clark LLP

(57) ABSTRACT

An outer mirror structure for a vehicle includes a base part which is attached to a vehicle body, a housing which is provided to a vehicle outer side of the base part and is rotatably supported by the base part, a base side mold member which is mounted on the base part and extends in substantially horizontal direction, and a housing side mold member which is mounted on the housing and extends in substantially horizontal direction. The base side mold member and the housing side mold member are formed in substantially continuous shape in a mating part when the housing is in a normal position.

14 Claims, 11 Drawing Sheets

A-A LINE END VIEW

VIEW SEEN IN B DIRECTION

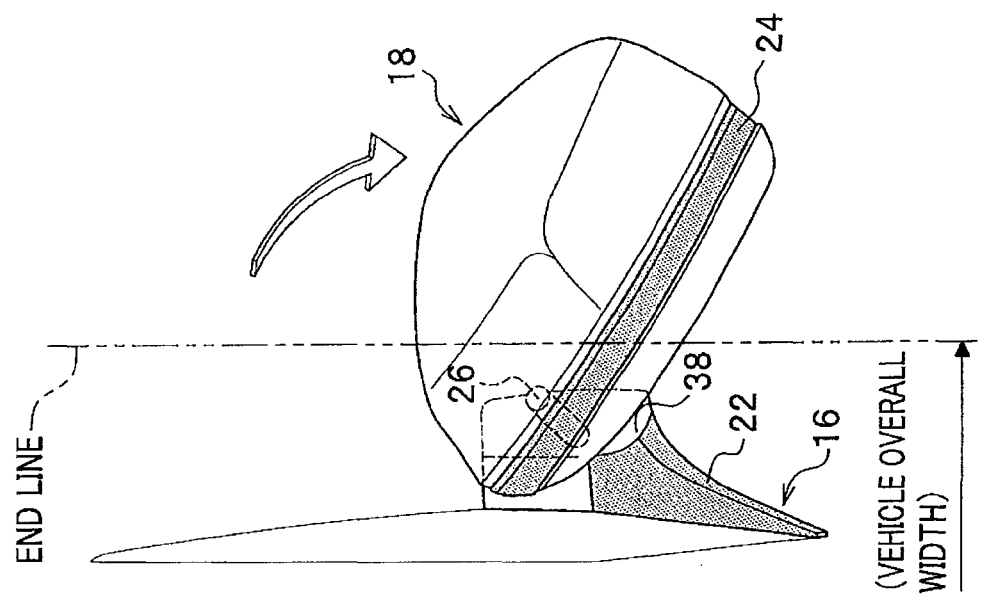
FIG.6A (REARWARD INCLINED POSITION)
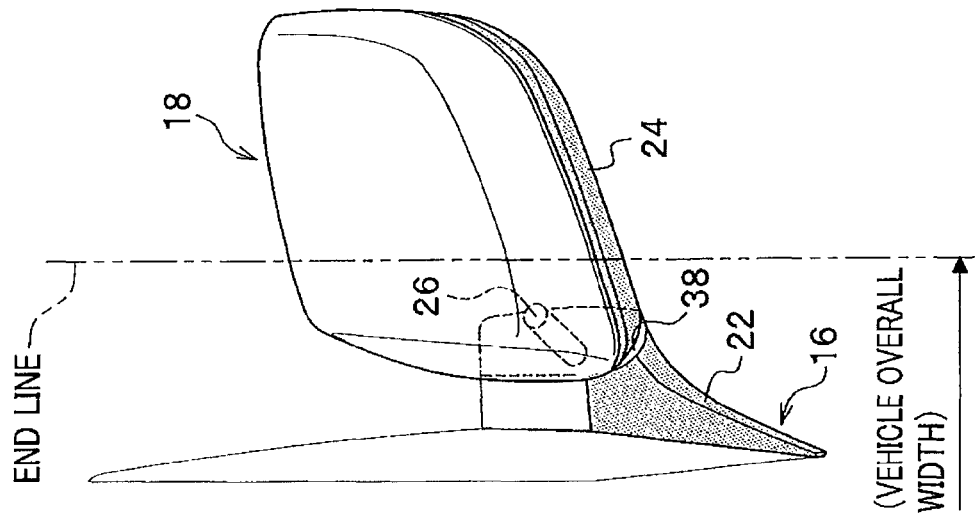
FIG.6B (NORMAL POSITION)
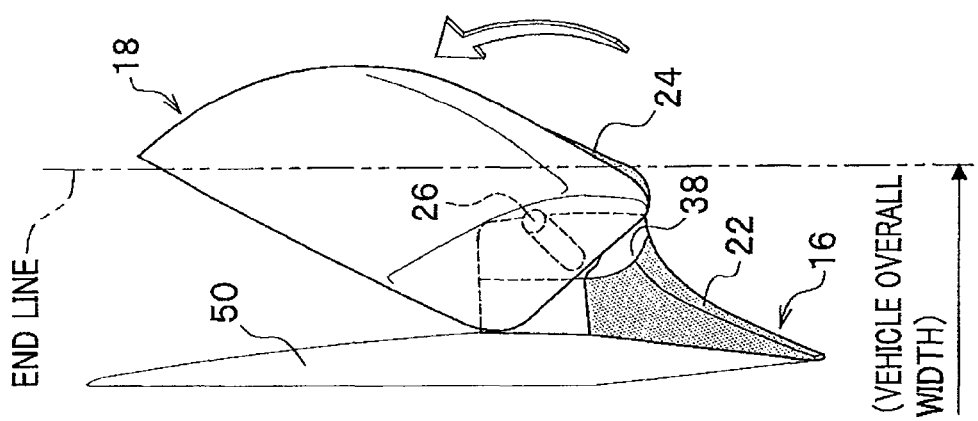
FIG.6C (FORWARD INCLINED POSITION)

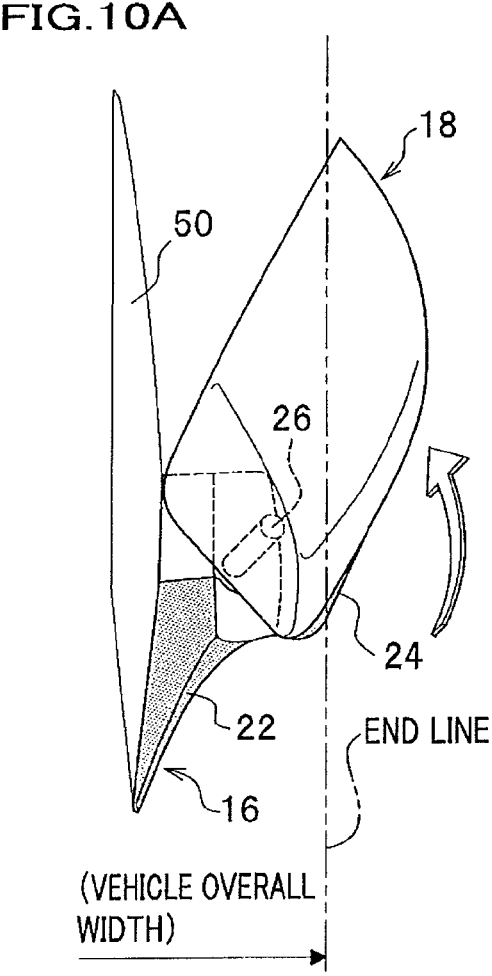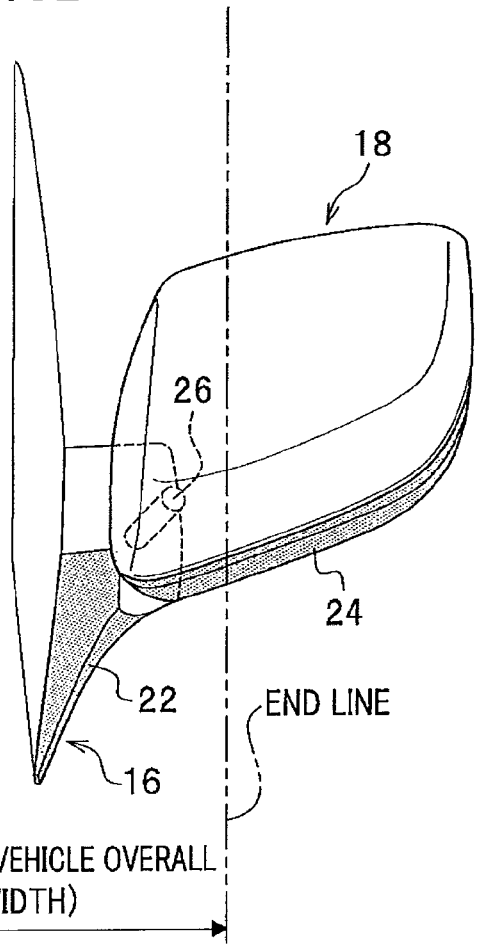

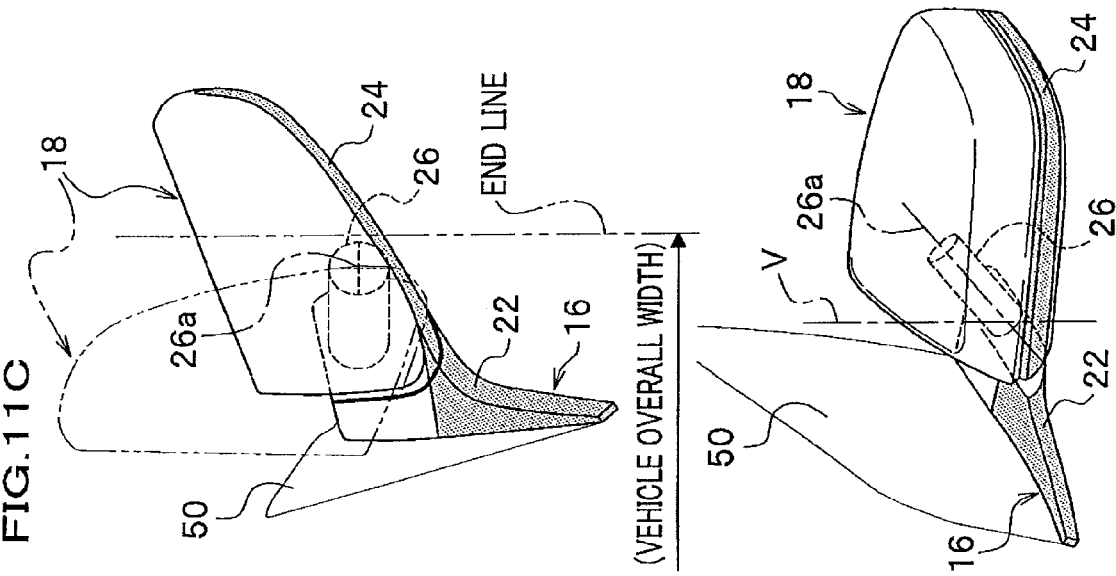
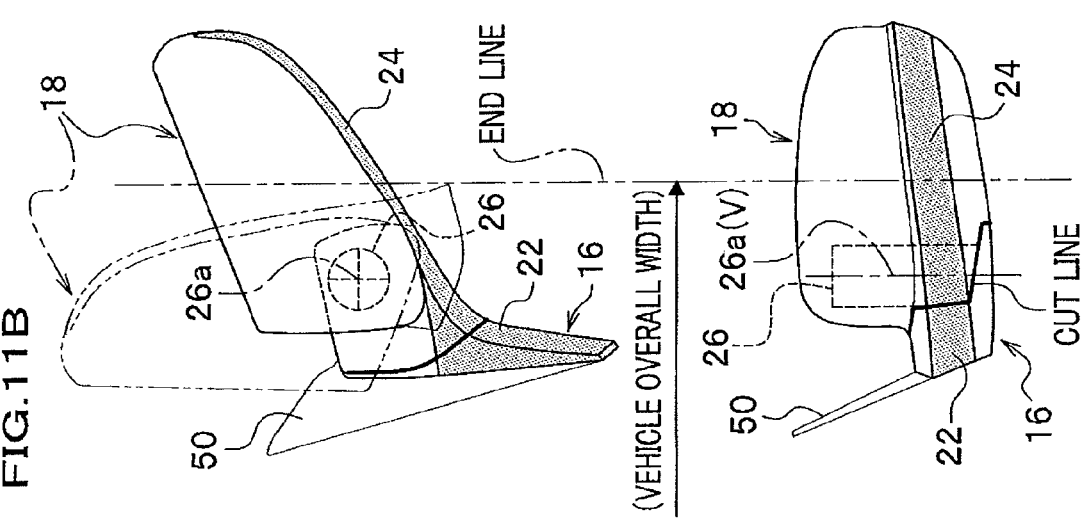
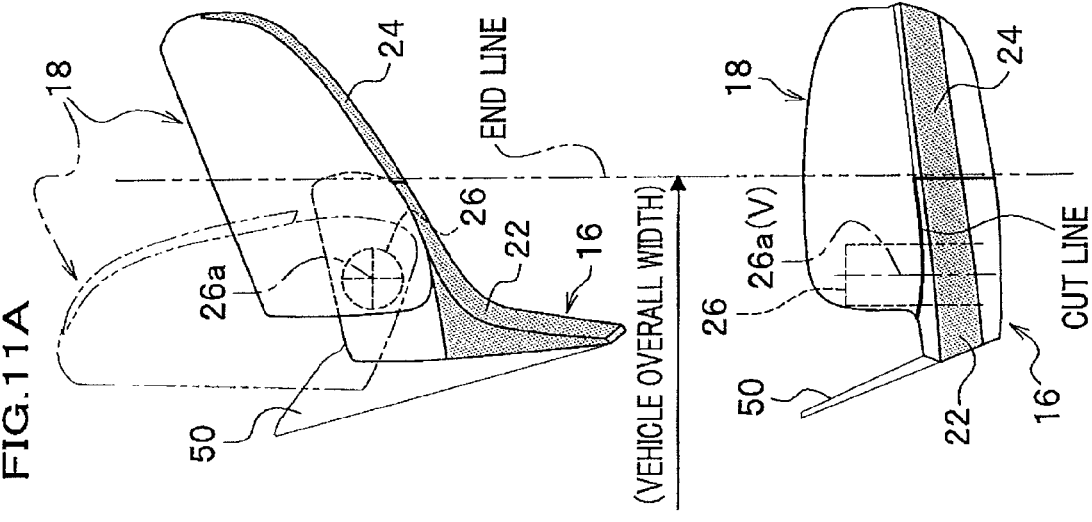

OUTER MIRROR STRUCTURE FOR VEHICLE

CROSS REFERENCE TO RELATED APPLICATIONS

This application claims the foreign priority benefit under 35 U.S.C. §119 of Japanese Patent Application No. 2007-292088 filed on Nov. 9, 2007, the disclosure of which is incorporated herein by reference.

BACKGROUND OF THE INVENTION

1. Field of the Invention

The present invention relates to an outer mirror structure for a vehicle which is provided to vehicles, such as an automobile.

2. Description of the Related Art

Vehicles such as automobiles include, as an outer mirror (outer back mirror), a door mirror for viewing rearward or a side of the vehicles. A door mirror generally includes a base part that is fixed to a door, a housing that is rotatably supported by the base part, and a mirror that is provided in the housing for reflecting rearward or a side of a vehicle.

Regarding such a door mirror, Unexamined Japanese Patent Application Publication No. H8-156687, for example, discloses a technical idea that the height of a base part of a door mirror is set to be substantially same as that of a beltline mold so that the base part and the beltline mold are visually integrated. In this case, the beltline mold is composed of a long and thin belt-like member which is mounted along an upper edge of a door outer panel and is mounted on the door outer panel to dress up a vehicle or to enhance the appearance of a vehicle.

Other than the beltline mold mounted on an upper edge of the door outer panel, various kinds of molds are used to decorate, for example, a window line, a door mirror, and a tale lamp.

Examples of a door mirror on which a mold is mounted are illustrated in FIGS. 12A to 12C. FIG. 12A shows a door mirror having a mold mounted along an oblique line of a base part that is formed in a substantially triangle shape. FIG. 12B shows a door mirror having a mold mounted along a part of a side of a base part that is parallel to the horizontal direction. FIG. 12C shows a door mirror having a mold mounted along a curved surface of the housing that projects outward. In all the examples described above, the molds are mounted on either one of the base part or the housing.

When molds are mounted on both of a base part of a door mirror and a housing that is rotatably supported by the base part so that the base part and the housing appear to be integrated, it is necessary to ensure a space large enough for the housing to rotate in a predetermined angle and to make the appearance configuration of the door mirror round-shaped, which disadvantageously restricts the shape of the door mirror as follows.

First, because the housing of the door mirror is projected outside of a vehicle by a predetermined length and may come in contact with a pedestrian, the housing is required to be rotatable forward or rearward of the vehicle by a predetermined load at an angle large enough to alleviate an impact to the pedestrian when the housing comes in contact with the pedestrian.

Second, an outer end of the base part of the door mirror that is fixed to a door and can not be rotated must not exceed the end line of the vehicle overall width.

Third, it is necessary to form all angle parts of the outer surface of a door mirror in a rounded shape whose curvature radius is equal to or more than a predetermined value regardless of whether the housing is positioned in a normal position where a driver can view the rearward of a vehicle or an inclined position (rotated position) where the housing is rotated forward or rearward of the vehicle at a predetermined angle with respect to the base part.

SUMMARY OF THE INVENTION

The present invention has been made in an attempt to provide an outer mirror structure for a vehicle that enables to visually integrate a base part and a housing by providing mold members to both of the base part and the housing respectively even under the circumstances that the shape of the door mirror is restricted as described above.

A first aspect of the present invention provides an outer mirror structure for a vehicle, including a base part which is attached to a vehicle body; a housing which is provided to a vehicle outer side of the base part and is rotatably supported by the base part, a base side mold member which is mounted on the base part and extends in a substantially horizontal direction; and a housing side mold member which is mounted on the housing and extends in the substantially horizontal direction. The base side mold member and the housing side mold member being formed in a substantially continuous shape via a mating part when the housing is in a normal position.

In the aforementioned outer mirror structure for the vehicle, a rotary shaft of the housing supported by the base part is inclined outward of the vehicle body at a predetermined angle with respect to a vertical line, and a gap which extends in a direction perpendicular to the rotary shaft is formed between the base part and the housing in the mating part.

In the aforementioned outer mirror structure for the vehicle, either one of the base side mold member and the housing side mold member has a rounded shape at a distal end of the either one of the base side mold member and the housing side mold member in the mating part, and the other one of the base side mold member and the housing side mold member has a protrusion projecting toward the either one of the base side mold member and the housing side mold member at an end of the other one of the base side mold member and the housing side mold member.

In the aforementioned outer mirror structure for the vehicle, a cutline is formed by the protrusion and the distal end in an arched shape in a side view at a part in the mating part where the base side mold member and the housing side mold member are opposed to each other, and wherein the side view is a view of the outer mirror structure seen from any direction except an up-down direction.

In the aforementioned outer mirror structure for the vehicle, the gap extending in the direction perpendicular to the rotary shaft in the mating part is smaller than a gap between the protrusion and the distal end.

Other features and advantages of the present invention will become more apparent from the following detailed descriptions of the invention when taken in conjunction with the accompanying drawings.

BRIEF DESCRIPTION OF THE DRAWINGS

FIG. 6A is a perspective view of the door mirror positioned in a rearward inclined position.

FIG. 6B is a perspective view of the door mirror positioned in a normal position.

FIG. 6C is a perspective view of the door mirror positioned in a forward inclined position.

FIG. 10A is a perspective view of the housing of the door mirror according to the second modification shown in FIG. 9 that is rotated rearward.

FIG. 10B is a perspective view of the housing of the door mirror according to the second modification shown in FIG. 9 that is in the normal position.

FIGS. 11A to 11C are illustrations for explaining third to fifth modifications that the applicant works out.

DETAILED DESCRIPTION OF THE INVENTION

Figure 1:
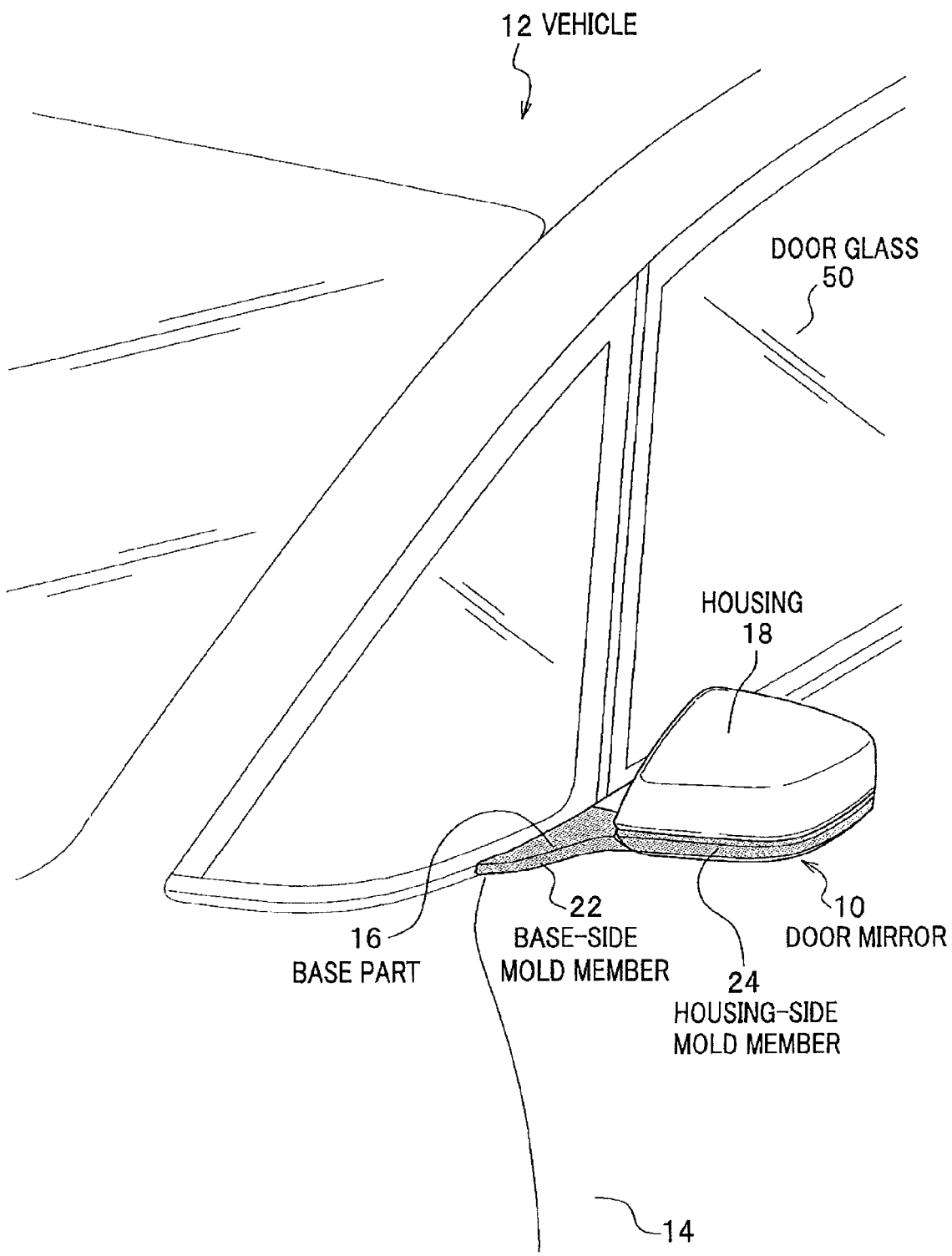
FIG. 1 is a perspective view of a door mirror to which an outer door mirror structure for a vehicle according to an embodiment of the present invention is applied.
Figure 2:
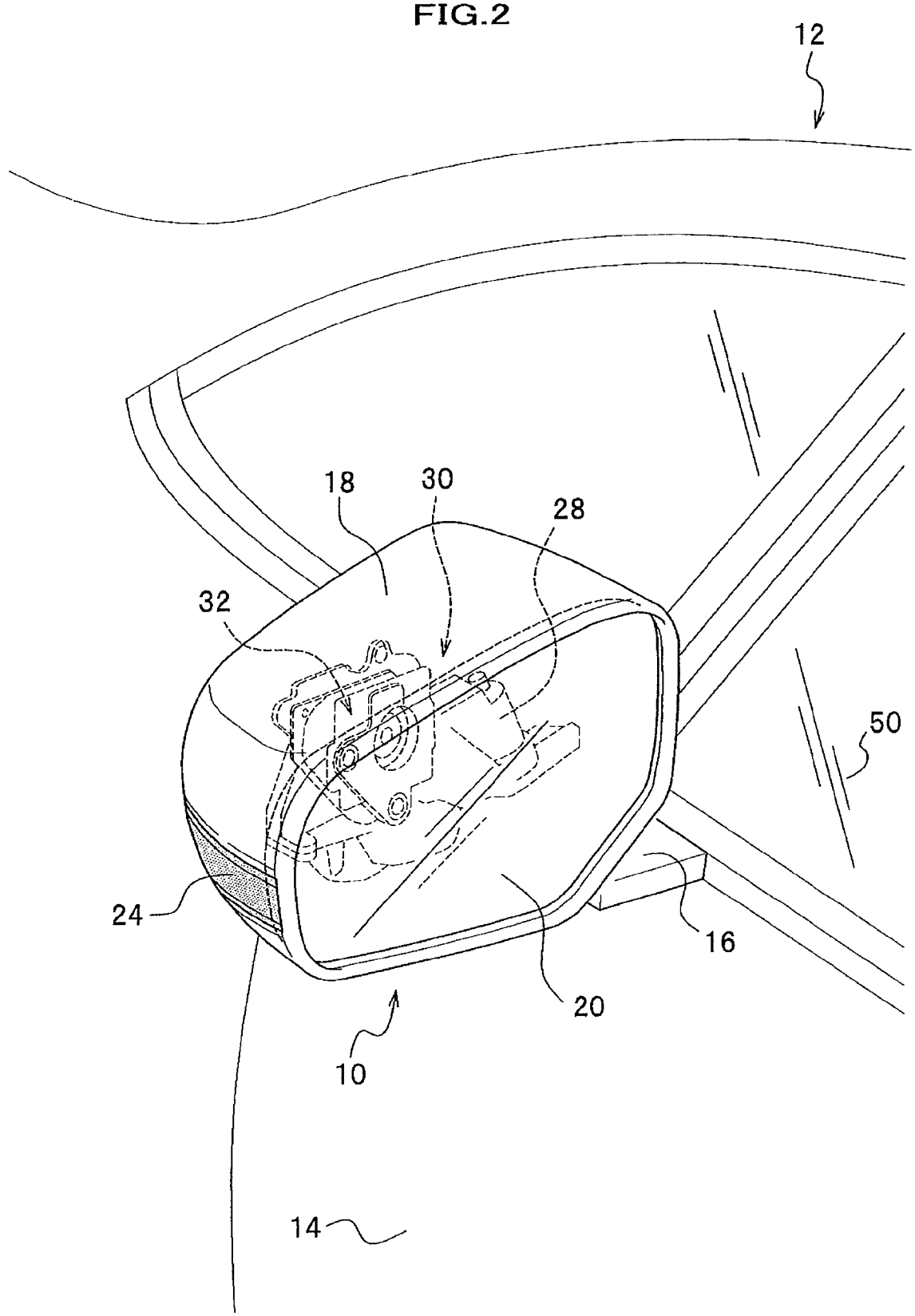
FIG. 2 is a perspective view of the door mirror seen from the rear side of the vehicle.

An embodiment of the present invention is described in detail below with reference to the accompanying drawings as appropriate. FIG. 1 is a perspective view of a door mirror to which an outer door mirror structure for a vehicle according to the embodiment of the present invention is applied. FIG. 2 is a perspective view of the door mirror seen from the rear side of the vehicle.

As shown in FIG. 1, a door mirror 10 includes a base part 16 attached and fixed to a door 14 nearer to the assistant driver's seat of a vehicle 12, a housing 18 which is rotatably supported by the base part 16 and is rotatably attached to the outer side of the base part 16, and a mirror 20 (see FIG. 2) that is provided to an opening of the housing 18 and reflects the rearward view or the side view of a vehicle. The door mirror 10 further including a base side mold member 22 that is mounted on the base part 16 such that the base side mold member 22 extends along the base part 16 in substantially horizontal direction, and a housing side mold member 24 that is mounted on an outer surface of the housing 18 such that the housing side mold member 24 extends along the outer surface of the housing 18 in substantially horizontal direction.

The housing 18 is attached to the base 16 in such a manner that the housing 18 is rotatably movable among a forward inclined position where the housing 18 is rotated forward in a predetermined angle, a rearward inclined position where the housing 18 is rotated rearward in a predetermined angle, and a normal position where the housing 18 is projected in a lateral direction of a vehicle (width direction) (see FIGS. 6A to 6C) about an axis line 26a of a rotary shaft 26 (see FIG. 3A) as a pivot. The axis line 26a is inclined with respect to the vertical line (V) at a predetermined angle within the range of approximately 15 to 25 degrees.

The housing 18 includes, in the opening thereof, a turning driving mechanism 30 having an electric motor 28 that drives and rotates the housing 18 between the rearward inclined position (storing position) and the normal position where the housing 18 is projected in the lateral direction of the vehicle about the rotary shaft 26 as a pivot, and a mirror tilting mechanism 32 (see FIG. 2) having a plurality of actuators for tilting the mirror 20 in an up-down direction and a right-left direction that is provided on the opening surface of the housing 18.

As, shown in FIG. 1, the base side mold member 22 is mounted over a narrow side surface of the base part 16 linearly extending in substantially horizontal direction and the wide top and bottom surfaces of the base part 16. The housing side mold member 24 is mounted along the curved part of the outer surface of the housing 18 in substantially horizontal direction in such a manner that the housing side mold member 24 are substantially continuous with the base side mold member 22 in a straight line. The base side mold member 22 and the housing side base member 24 are preferably made of, e.g., a plated mold which has excellent appearance.

Figure 3A:
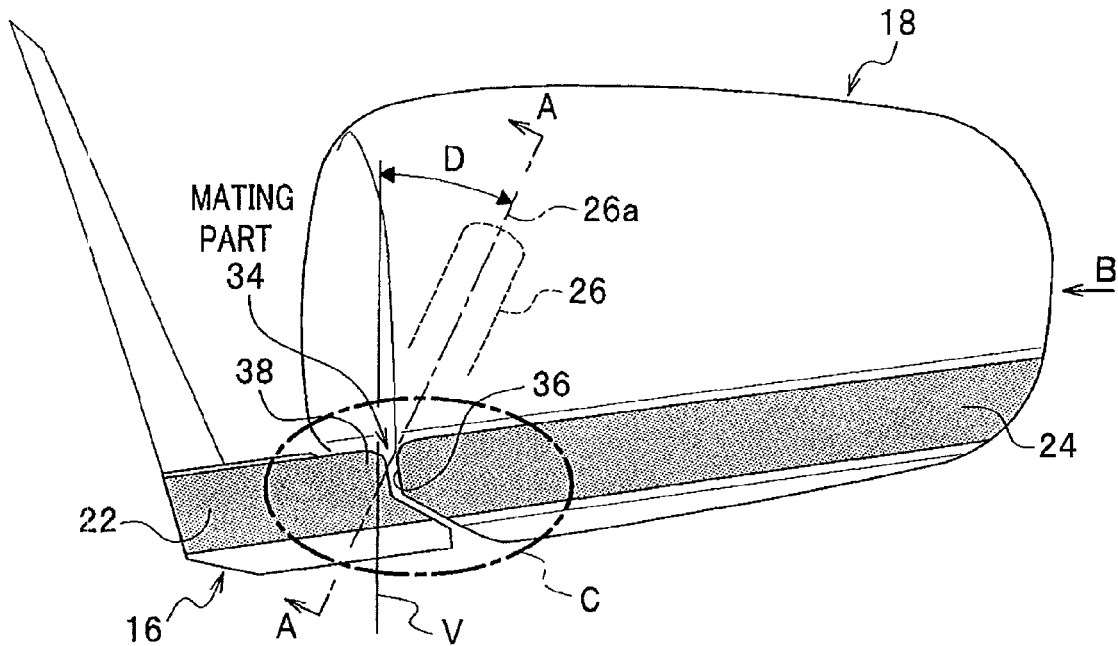
FIG. 3A is a front view of the door mirror seen from the front side of the vehicle.
Figure 3B:
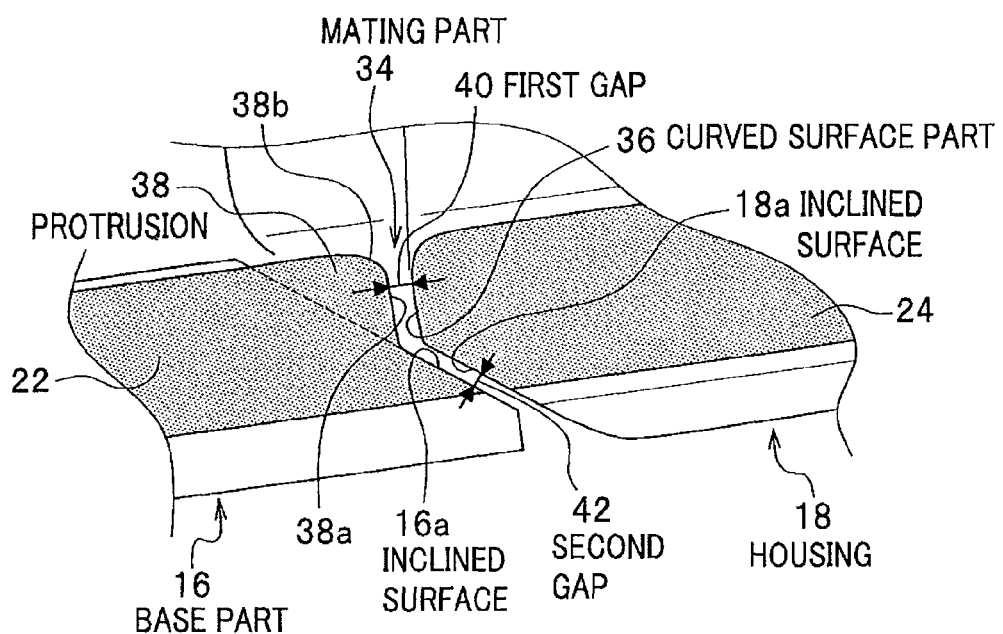
FIG. 3B is a partial enlarged view of a part C shown in FIG. 3A.

As shown in FIGS. 3A and 3B, a mating part 34 is provided between the base part 16 and the housing 18, in which an end of the base side mold member 22 and an end of the housing side mold member 24 are faced with each other. A distal end of the housing 18 in the mating part 34 is provided with a curved surface part 36 that is formed by a curved surface of a predetermined curvature radius while the base 16 is provided with a protrusion 38 that projects toward the housing 18.

The mating part 34 includes a first gap 40 that is formed between the protrusion 38 of the base part 16 and the curved surface part 36 of the housing 18 and is spaced apart in a predetermined distance in a substantially horizontal direction. Below the first gap 40, a second gap 42 that is continuous with the first gap 40 and extends in a direction substantially perpendicular to the rotary shaft 26 is formed between an inclined surface 16a of the base part 16 and an inclined surface 18a of the housing 18 that are opposed to each other. It is preferable to design the space of the second gap 42 smaller than that of the first gap 40.

The mating part 34 is provided between the base part 16 and the housing 18 in such a manner that the mating part 34 is inclined in a predetermined angle with respect to an extending direction of the base side mold member 22 and the housing side mold member 24 (straight line direction), which allows to eliminate the sense of break in the extending direction of the base side mold member 22 and the housing side mold member 24 and to emphasize increased visual integrity.

Figure 8:
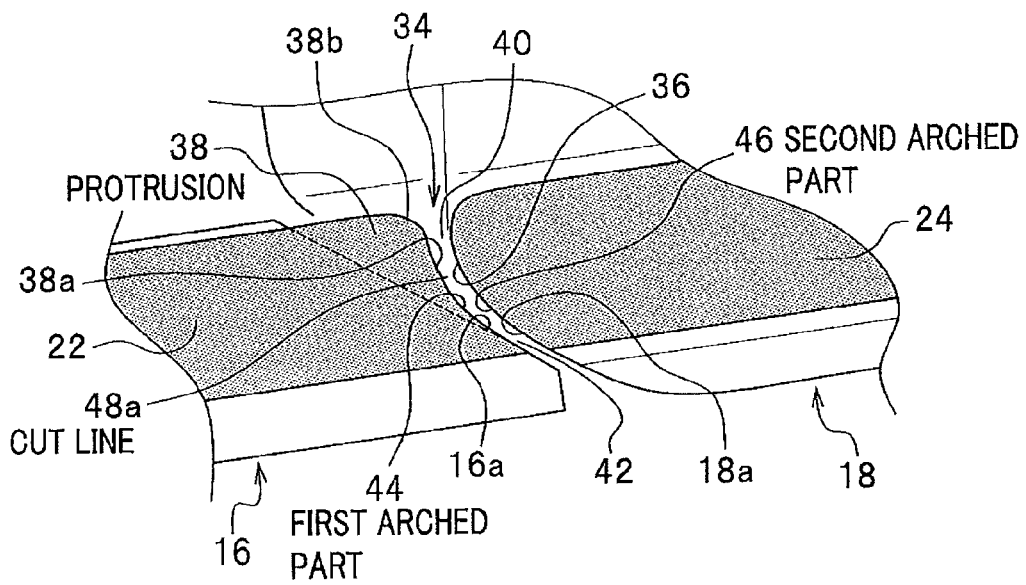
FIG. 8 is a partial enlarged view of a first modification of the door mirror.

In a first modification of the present invention shown in FIG. 8, a first arched part 44 is formed on the border between the protrusion 38 of a ridge line 38a and an inclined surface 16a, and a second arched part 46 is formed on the border between the curved surface part 36 of the housing 18 that is opposed to the base part 16 and the inclined surface 18a. This allows to form a cutline 48a that is in a gently arched shape in a front view seen from the front side of the vehicle between the protrusion 38 of the base part 16 and the curved surface part 36 (a distal end) of the housing 18.

Figure 4A:
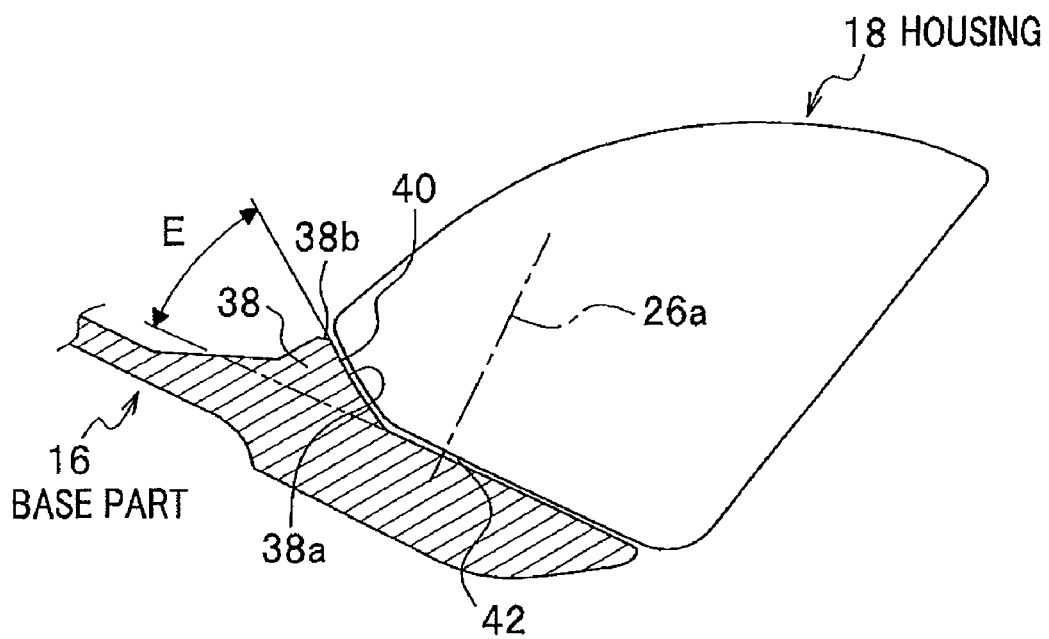
FIG. 4A is an end view along a line A-A shown in FIG. 3A.
Figure 4B:
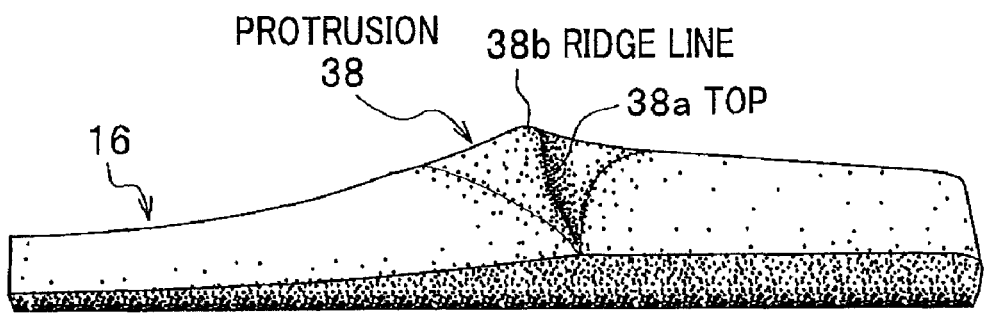
FIG. 4B is a view of a base part seen in a direction of an arrow B in FIG. 3A.

As shown in FIGS. 4A and 4B, the protrusion 38 is formed at the front side of the base 16 that is opposed to the housing 18 such that the protrusion 38 is expanded in a substantially triangle shape in a side view seen form the side of the vehicle. The protrusion 38 is provided at a location where it does not interfere with the housing 18 when the housing 18 is rotated (tilted) rearward or forward of the vehicle. It is preferable to design the ridge line 38a of the protrusion 38 to be inclined in approximately 30 to 45 degrees with respect to the inclined surface 16a of the base part 16, as will be described later, and to make the height from the inclined surface 16a to a top 38b of the protrusion 38 approximately 5 mm.

Figure 5A:
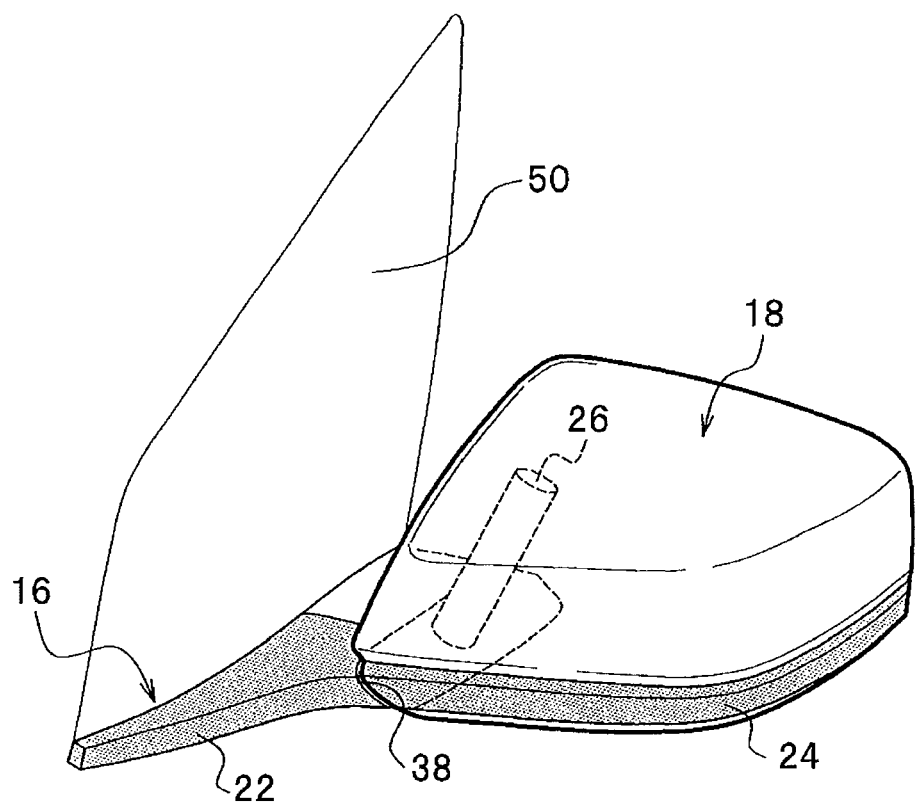
FIG. 5A is a perspective view of the door mirror in a normal position.
Figure 5B:
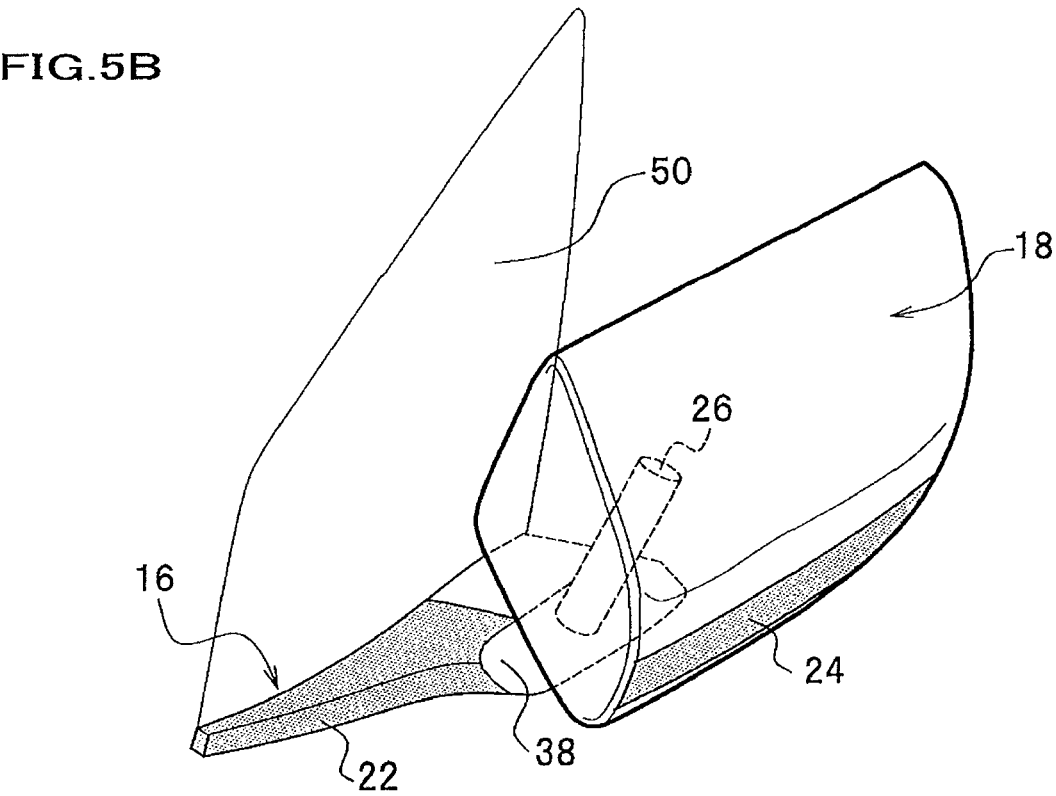
FIG. 5B is a perspective view of the door mirror of which housing is stored rearward.
Figure 7A:
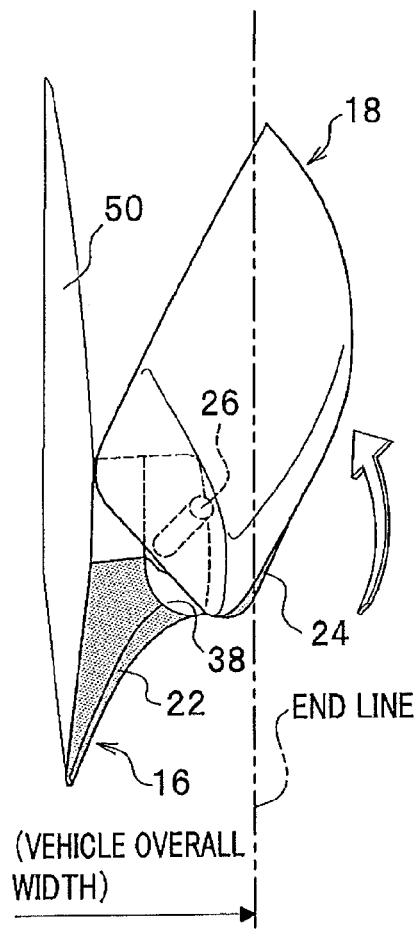
FIG. 7A is a perspective view of the housing of the door mirror that is rotated rearward.
Figure 7B:
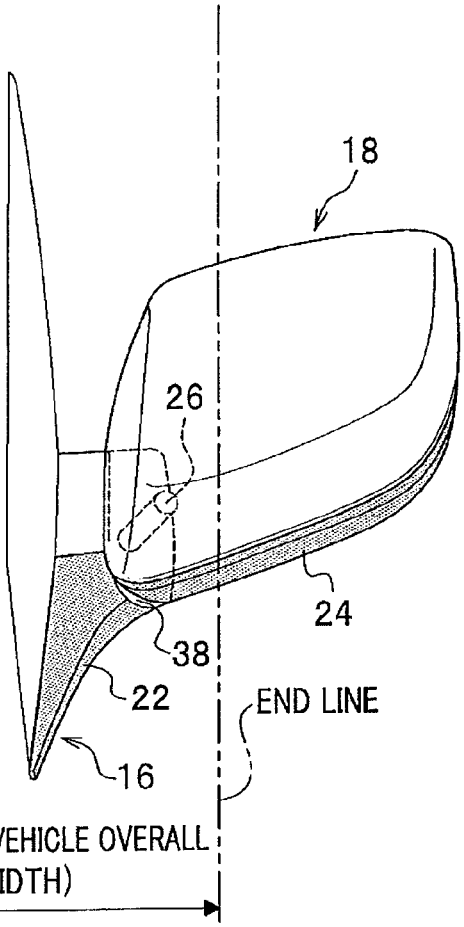
FIG. 7B is a perspective view of the housing of the door mirror that is in the normal position.
Figure 9A:
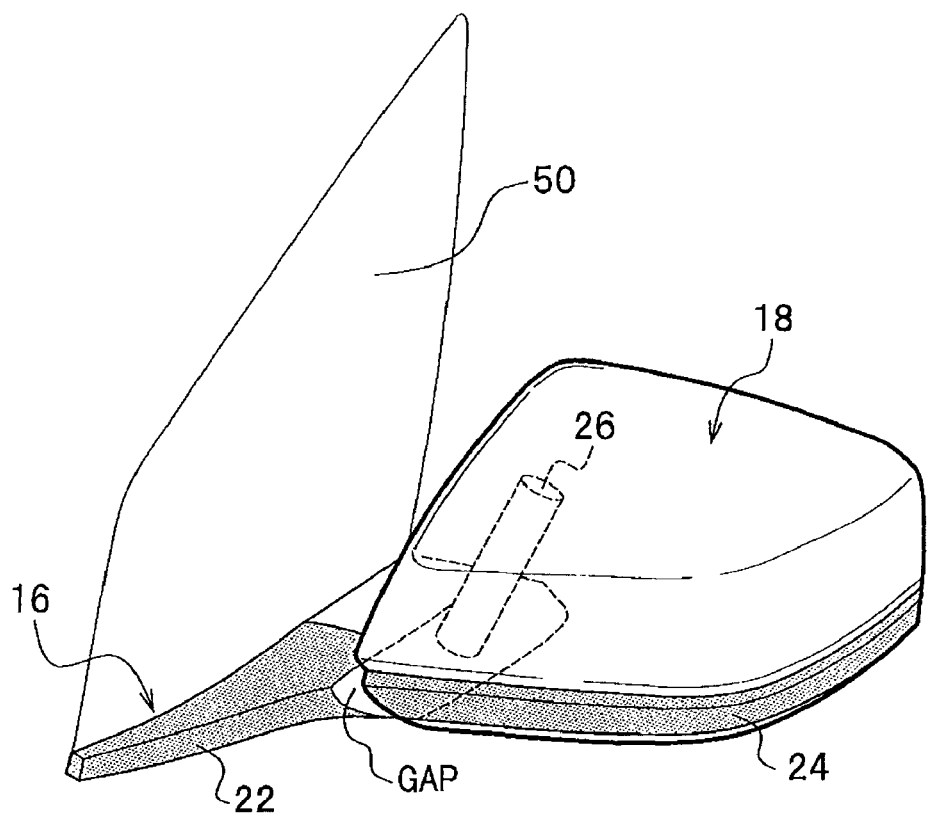
FIG. 9A is a perspective view of a door mirror according to a second modification which does not include a protrusion when the door mirror is in the normal position.
Figure 9B:
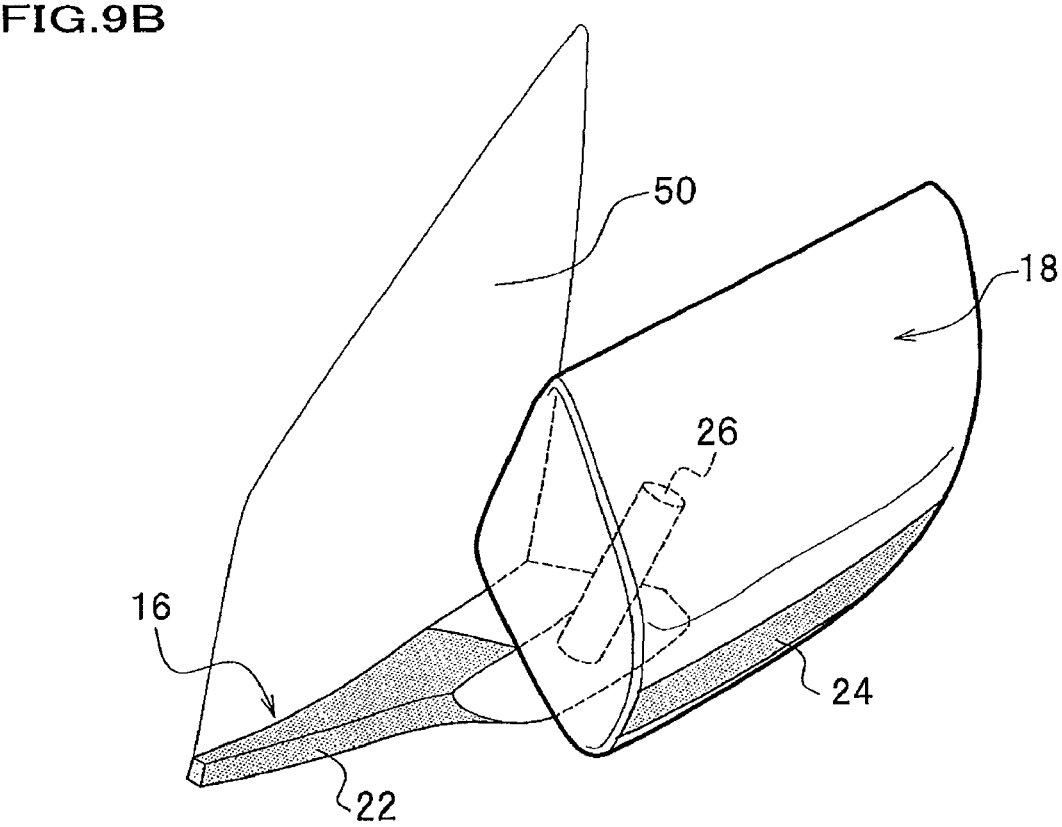
FIG. 9B is a perspective view of the door mirror according to the second modification where its housing is stored rearward.
Figure 12A:
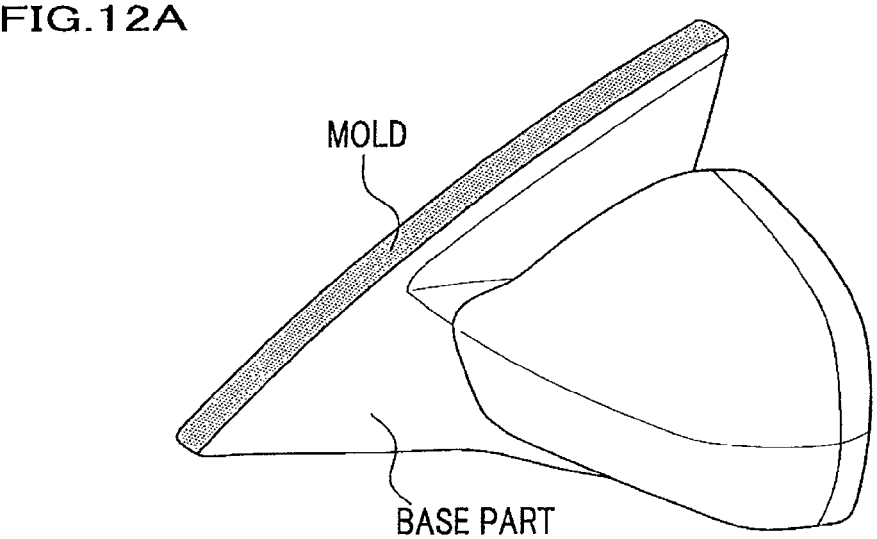
FIGS. 12A to 12C are illustrations showing door mirrors on which molds are mounted using conventional techniques.
Figure 12B:
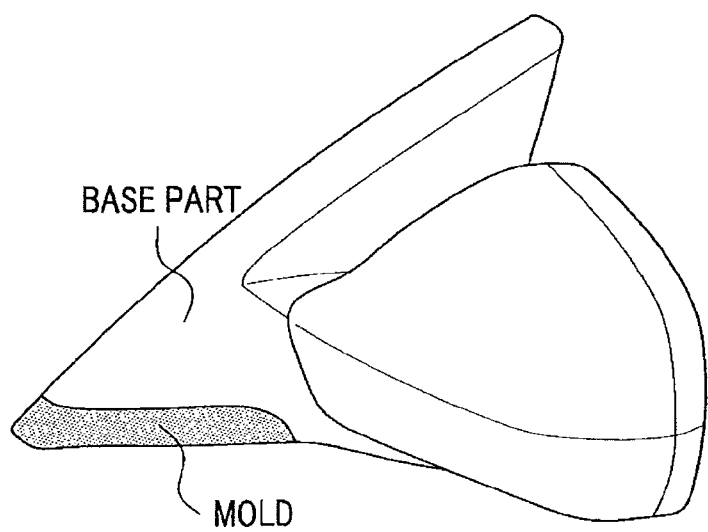
Figure 12C:
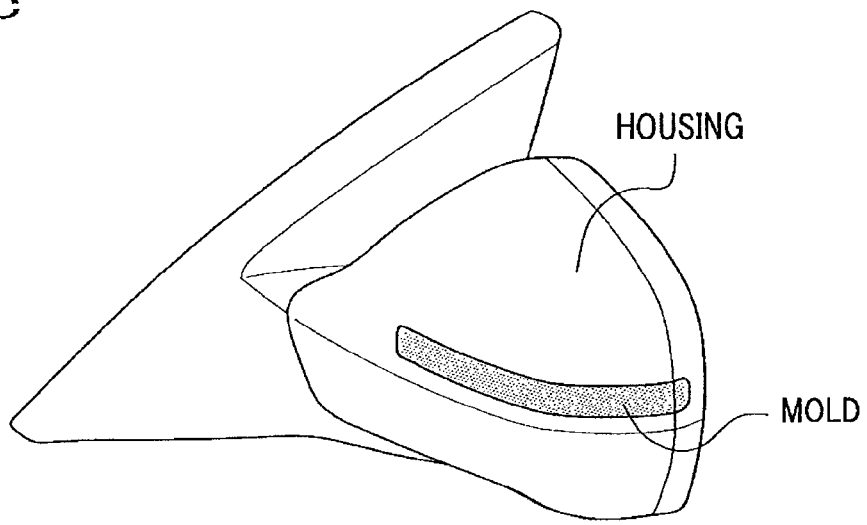

By providing the base part 16 with the protrusion 38, a cutline 48 between the base part 16 and the housing 18 is made smooth, and the gap between the base part 16 and the housing 18 seen from the front side of the vehicle is made small, which allows to enhance the appearance of the door mirror 10 (see FIGS. 5 to 7). In contrast, in a second modification of the present invention that the applicant works out in which the protrusion 38 is not provided to the base part 16, the gap between the base part 16 and the housing 18 is larger and conspicuous, which deteriorates the appearance of the door mirror 10 (see FIGS. 9 and 10).

The door mirror 10 to which the outer mirror structure for the vehicle according to the embodiment is applied is basically configured as described above. Next, advantages of the door mirror 10 will be described.

In the embodiment, the base side mold member 22 mounted on the base part 16 of the door mirror 10 and the housing side base member 24 mounted on the housing 18 can be provided in a substantially continuous straight line, which generates visual integrity of the base side base member 22 and the housing side base member 24. In the embodiment, the design of the molds is also excellent with functions of the door mirror 10 sufficiently satisfied, even if the distance between an outer end of the base part 16 and the end line of the vehicle overall width is small.

In the embodiment, the dimension of the base part 16 does not exceed the end line of the vehicle overall width because the rotary shaft 26 of the housing 18 is inclined in a predetermined angle, intersecting with the vertical line (V). Furthermore, the housing 18 is prevented from coming in contact with a door glass 50 that is disposed adjacent to the base part 16 even when the housing 18 is rotated (tilted) forward or rearward of a vehicle.

The inclination angle D (see FIG. 3A) of the rotary shaft 26 of the housing 18 may be set in a range from approximately 15 to 25 degrees with respect to the vertical line (V). In this configuration, the rotating load applied to the housing 18 is not particularly large, and the strength of the housing 18 against external force is not insufficient, but appropriate. The configuration also ensures a predetermined thickness of the housing 18 in a front-rear direction without making the thickness of the housing 18 in the front-rear direction too small, which increases degrees of freedom in design and provides an excellent aerodynamic characteristic.

Furthermore, in this embodiment, the protrusion 38 is formed on the inclined surface 16a of the base part 16 that is opposed to the rotational surface of the housing 18. Thus the distal end (the curved surface part 36) of the housing side mold member 24 in the mating part 34 between the base side mold member 22 and the housing side mold member 24 takes a form of an obtuse angle, and the gap between the housing 18 and the base part 16 is prevented from being expanded even when an angle portion of the housing 18 is rounded to meet requirements of a door mirror, which allows to achieve the visual continuity of the base side mold member 22 and the housing side mold member 24. Because a curvature radius required for the angle portion of the door mirror 10 is 2.5 mm, it is sufficient to set the height of the top 38b of the protrusion 38 from the inclined surface 16a approximately 5 mm. By designing the inclination angle E (see FIG. 4A) of the ridge line 38a of the protrusion 38 to be in a range from approximately 30 to 45 degrees, it is possible to favorably avoid influence of the protrusion 38 on the strength, moldability and die releasing property of the mold member.

In the embodiment, because the protrusion 38 is formed in the base part 16, it is possible to prevent unnecessary gap from being formed, and thus the visual integrity of the base part 16 and the housing 18 is not impaired. The protrusion 38 also prevents wind from entering the gaps between the base part 16 and the housing 18 (the first gap 40 and the second gap 42) from the front side of the vehicle, whereby wind noise can be reduced.

Moreover, because the door mirror 10 is configured by the simple structure in the embodiment, the door mirror 10 is easily manufactured and assembled. Further, because the inclination angle D of the rotary shaft 26 of the housing 18 (see FIG. 3A) is set to be in a range from approximately 15 to 25 degrees with respect to the vertical line (V), it is possible to realize a good rotation condition of the housing 18 which rotates in a predetermined angle with respect to the base part 16 about the rotary shaft 26 as a pivot.

In the embodiment, the cutline 48 between the protrusion 38 of the base part 16 and the housing 18 is formed in a gently arched shape. Thus, the cutline 48 fits into a design of the door mirror 10 without impairing the design thereof.

Moreover, the second gap 42 is set to be smaller than that of the first gap 40 in the embodiment. Because the dimension control of the second gap 42 is easier than that of the first gap 40, the second gap 42 can be made smaller easily, which enables to further enhance the appearance of the door mirror 10.

As described above, in the embodiment, it is possible to provide the outer mirror structure for the vehicle 12 that enables to visually integrate the base part 16 and the housing 18 by providing the mold members to the base part 16 and the housing 18 respectively under the circumstances that the shape of the door mirror 10 is restricted.

Next, modifications of the present invention that the applicant works out are described below in contrast with the embodiment. In the description of the modifications, the same reference numerals are assigned to the components corresponding to those of the embodiment for convenience of explanation.

In a third modification shown in FIG. 11A, the rotary shaft 26 of the housing 18 is disposed substantially parallel to the vertical line (V) and the dimension of the base part 16 is enlarged in the outward direction of a vehicle. In the third modification, the outside end of the base part 16 exceeds the end line of the vehicle overall width. In contrast, in the embodiment, the design of the molds is excellent with functions of the door mirror 10 satisfied even if the distance from the outer end of the base part 16 to the end line of the vehicle overall width is small.

In a fourth modification shown in FIG. 11B, the rotary shaft 26 of the housing 18 is disposed substantially parallel to the vertical line (V) and the cutline between the base part 16 and the housing 18 is formed closer to the base part 16 compared with the third modification. In the fourth modification, because the distance dimension between the housing 18 and the door glass 50 is small, when the housing 18 is rotated, there is a risk that the housing 18 is interfered with the door glass 50 or comes in contact with the door glass 50, which results in an insufficient rotatable angle of the housing 18 (the housing 18 is not stored at a predetermined position at the rear side of the vehicle). In contrast, in the embodiment, the housing 18 can be prevented from being interfered with the door glass 50 or being in contact with the door glass 50, therefore it is possible to realize a good rotation condition of the housing 18 which rotates in a predetermined angle with the rotary shaft 26 as a pivot.

In a fifth modification shown in FIG. 11C, the inclination angle D of the rotary shaft 26 of the housing 18 is set to be more than 25 degrees with respect to the vertical line (V). In the fifth modification, the housing 18 may not be rotated smoothly, which may require the turning driving mechanism 30 having an electric motor 28 to generate a large torque. In contrast, in the embodiment, because the inclination angle D of the rotary shaft 26 of the housing 18 is set to be in a range from approximately 15 to 25 degrees with respect to the vertical line (V), the rotating load applied to the housing 18 is not significantly high, which allows to ensure the same durable years of the turn driving mechanism as those of a conventional turn driving mechanism.

In the fifth modification where the inclination angle D of the rotary shaft 26 of the housing 18 is set larger, a distal end of the housing 18 that is adjacent to the base part 16 takes the form of an acute angle, and when the acute angle part is rounded to meet the requirements of a mirror, the length of the acute angle part that projects toward the base part 16 is decreased, which expands the gap of the cutline. In contrast, in the embodiment, because the protrusion 38 is provided on the inclined surface 16a of the base part 16 that is opposed to the rotational surface of the housing 18, the gap of the cutline is not expanded even if the angle part of the housing 18 is rounded to meet requirements of a mirror, whereby visual continuity of the base side mold member 22 and the housing side mold member 24 can be realized. Moreover, in the embodiment, the protrusion 38 can prevent wind from coming into the gaps between the base part 16 and the housing 18 (the first gap 40 and the second gap 42) from the front side of a vehicle, whereby wind noise can be reduced.

The present invention is not limited to the above described embodiment and modifications, and may be applied, for example, to a fender mirror without being limited to a door mirror.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An outer mirror structure for a vehicle, comprising:
   a base part attached to a vehicle body, the base part including an inner side that faces toward the vehicle body and an outer side that faces away from the vehicle body;
   a housing that receives a mirror, the housing being rotatably attached to the outer side of the base part and including an inner surface that faces toward the mirror and an outer surface that is opposite the inner surface;
   a base side mold member mounted on a part of the outer side of the base part and extending in a substantially horizontal direction, the part of the outer side of the base part being a part in a direction perpendicular to the substantially horizontal direction of the outer side of the base part; and
   a housing side mold member mounted on a part of the outer surface of the housing and extending along the outer surface of the housing in the substantially horizontal direction, the part of the outer surface of the housing being a part in a direction perpendicular to the substantially horizontal direction of the outer surface of the housing,
   wherein
   the base side mold member and the housing side mold member are aligned to have a substantially continuous shape and nearly contact one another when the housing is in a normal position that allows for usage of the mirror as a driving aid.

2. The outer mirror structure for the vehicle according to claim 1, further comprising a rotary shaft in the housing, wherein
   the rotary shaft of the housing supported by the base part is inclined outward of the vehicle body at a predetermined angle with respect to a vertical line, and wherein
   the base part and the housing cooperate to define a gap that extends in a direction perpendicular to the rotary shaft.

3. The outer mirror structure for the vehicle according to claim 2, wherein
   either one of the base side mold member and the housing side mold member has a rounded shape at a distal end of the either one of the base side mold member and the housing side mold member, and
   the other one of the base side mold member and the housing side mold member has a protrusion projecting toward the either one of the base side mold member and the housing side mold member at an end of the other one of the base side mold member and the housing side mold member.

4. The outer mirror structure for the vehicle according to claim 3, wherein
   a cutline is formed in an arched shape in a side view by the protrusion and the distal end, the cutline being formed where the base side mold member and the housing side mold member are opposed to each other, and wherein
   the side view is a view of the outer mirror structure seen from any direction except an up-down direction.

5. The outer mirror structure for the vehicle according to claim 3, wherein
   the gap formed between the base part and the housing and extending in the direction perpendicular to the rotary shaft is smaller than a gap between the protrusion and the distal end.

6. The outer mirror structure for the vehicle according to claim 4, wherein
   the gap formed between the base part and the housing and extending in the direction perpendicular to the rotary shaft is smaller than a gap between the protrusion and the distal end.

7. An outer mirror structure for a vehicle, comprising:
   a base part attached to a vehicle body;
   a housing provided to a vehicle outer side of the base part and being rotatably supported by the base part;
   a base side mold member mounted on the base part and extending in a substantially horizontal direction;
   a housing side mold member mounted on the housing and extending in the substantially horizontal direction;
   a rotary shaft provided in the housing and supported by the base part, the rotary shaft being inclined outward of the vehicle body at a predetermined angle with respect to a vertical line; and
   a mating part between the base part and the housing, the mating part including a gap formed between the base part and the housing and extending in a direction perpendicular to the rotary shaft, wherein the base side mold member and the housing side mold member are formed in a substantially continuous shape via the mating part when the housing is in a normal position.

8. The outer mirror structure for the vehicle according to claim 7, wherein either one of the base side mold member and the housing side mold member has a rounded shape at a distal end of the either one of the base side mold member and the housing side mold member in the mating part, and the other one of the base side mold member and the housing side mold member has a protrusion projecting toward the either one of the base side mold member and the housing side mold member at an end of the other one of the base side mold member and the housing side mold member.

9. The outer mirror structure for the vehicle according to claim 8, wherein the mating part includes a cutline formed in an arched shape in a side view by the protrusion and the distal end, the cutline being formed in a portion of the mating part where the base side mold member and the housing side mold member are opposed to each other, and wherein the side view is a view of the outer mirror structure seen from any direction except an up-down direction.

10. The outer mirror structure for the vehicle according to claim 8, wherein the gap formed between the base part and the housing and extending in the direction perpendicular to the rotary shaft in the mating part is smaller than a gap between the protrusion and the distal end.

11. An outer mirror structure for a vehicle, comprising:
a base part attached to a vehicle body;
a housing provided to a vehicle outer side of the base part and being rotatably supported by the base part;
a base side mold member mounted on the base part and extending in a substantially horizontal direction;
a housing side mold member mounted on the housing and extending in the substantially horizontal direction; and
a mating part between the base part and the housing, wherein either one of the base side mold member and the housing side mold member has a rounded shape at a distal end of the either one of the base side mold member and the housing side mold member in the mating part, and the other one of the base side mold member and the housing side mold member has a protrusion projecting toward the either one of the base side mold member and the housing side mold member at an end of the other one of the base side mold member and the housing side mold member, and wherein the base side mold member and the housing side mold member are formed in a substantially continuous shape via the mating part when the housing is in a normal position.

12. The outer mirror structure for the vehicle according to claim 11, further comprising a rotary shaft in the housing, wherein the rotary shaft of the housing supported by the base part is inclined outward of the vehicle body at a predetermined angle with respect to a vertical line, and wherein the mating part includes a gap formed between the base part and the housing and extending in a direction perpendicular to the rotary shaft.

13. The outer mirror structure for the vehicle according to claim 11, wherein the mating part includes a cutline formed in an arched shape in a side view by the protrusion and the distal end, the cutline being formed in a portion of the mating part where the base side mold member and the housing side mold member are opposed to each other, and wherein the side view is a view of the outer mirror structure seen from any direction except an up-down direction.

14. The outer mirror structure for the vehicle according to claim 12, wherein the gap formed between the base part and the housing and extending in the direction perpendicular to the rotary shaft in the mating part is smaller than a gap between the protrusion and the distal end.

* * * * *